United States Patent
Sanders et al.

(10) Patent No.: US 8,710,406 B2
(45) Date of Patent: Apr. 29, 2014

(54) SAFETY DEVICE AND METHOD FOR ELECTRIC HEATING APPLIANCES

(75) Inventors: Daniel Lee Sanders, Torrington, CT (US); Jonathan G Berera, Torrington, CT (US)

(73) Assignee: Conair Corporation, Stamford, CO (US)

(*) Notice: Subject to any disclaimer, the term of this patent is extended or adjusted under 35 U.S.C. 154(b) by 1457 days.

(21) Appl. No.: 12/234,225

(22) Filed: Sep. 19, 2008

(65) Prior Publication Data

US 2010/0073838 A1    Mar. 25, 2010

(51) Int. Cl.
*H05B 3/00* (2006.01)
*H02H 3/00* (2006.01)

(52) U.S. Cl.
USPC ............. 219/200; 219/240; 219/423; 361/94; 307/31

(58) Field of Classification Search
USPC ......... 219/200, 240, 250, 251, 386, 419, 423, 219/481, 482, 507; 361/87, 94, 103, 93.9, 361/89; 307/31

See application file for complete search history.

(56) References Cited

U.S. PATENT DOCUMENTS

| | | | |
|---|---|---|---|
| 7,554,409 B1 * | 6/2009 | Zhang et al. | 330/298 |
| 2008/0049367 A1 * | 2/2008 | Carson et al. | 361/87 |
| 2009/0103222 A1 * | 4/2009 | Hinterscher | 361/93.9 |

* cited by examiner

*Primary Examiner* — Shawntina Fuqua
(74) *Attorney, Agent, or Firm* — McCormick, Paulding & Huber, LLP

(57) ABSTRACT

An appliance includes a plurality of electrical loads and a load control circuit including at least a clock enable circuit and a full power timer. The clock enable circuit is configured and operatively connected to activate the full power timer when all of the loads are energized, and the full power timer is configured and operatively connected to de-energize at least one load selected from the plurality of loads on reaching a predetermined full power time limit.

14 Claims, 6 Drawing Sheets

SAFETY DEVICE AND METHOD FOR ELECTRIC HEATING APPLIANCES

FIELD OF THE INVENTION

The present invention relates to electric heating appliances and, more particularly, to safety devices and methods for electric heating appliances.

BACKGROUND OF THE INVENTION

Electric heating appliances, such as toasters, are well known in contemporary households and in commercial settings such as restaurants. Electric heating appliances include electric heating elements, and excessive heating of electric heating elements is undesirable. Thus, it is desirable to establish a design limit on the average operating power supplied to the heating appliance over a pre-defined period of time, and to maintain the actual average operating power during the period of time below the design limit, so as to avoid excessive heating.

The Underwriters' Laboratory, in standard UL-197 section 48, proposes three (3) hour Input Averaging Current ($I_{avg}$) as a suitable metric for the design limit and for the actual total operating power. $I_{avg}$ can be determined according to the equation $$I_{avg} = \frac{I_1 \times T_1 + I_2 \times T_2 + \ldots I_n \times T_n}{T_{cyc}}; \quad T_{cyc} = \sum_{i=1\ldots n} T_i \quad \text{(Eqn. 1)}$$

where $I_1$ represents an input current provided to the heating appliance during a first time segment of length $T_1$, $I_n$ represents an input current provided to the heating appliance during an nth time segment of length $T_n$, and $T_{cyc}$ is the total time period during which the input current is averaged.

UL-197 section 48 further requires that, for a three (3) hour averaging time period $T_{cyc}$, the input averaging current $I_{avg}$ should not exceed eighty percent (80%) of the plug-rated current $I_{rated}$. Typically, the plug-rated current $I_{rated}$ is a design value that equals or exceeds the full power current $I_{FP}$ through the plug with the heating appliance fully energized.

Various means are known in the art for achieving compliance with UL-197 section 48. For example, existing temperature-limiting circuits have been adapted to limit $I_{avg}$ based on empirical or calculated correlations between heating element temperatures and $I_{avg}$. However, adaptations of temperature-limiting circuits provide only approximate values of the input averaging current $I_{avg}$.

Accordingly, it is desirable to have a precise means for determining the input averaging current $I_{avg}$ by direct electrical measurements in order to achieve compliance with UL standard 197 section 48.

BRIEF SUMMARY OF THE INVENTION

According to the present invention, an input averaging control circuit uses timers to control an input averaging current $I_{avg}$ of an electric heating appliance.

In an embodiment of the present invention, an input averaging control circuit (IACC) cooperates with a plurality of heating timer circuits to maintain the input averaging current $I_{avg}$ at less than eighty percent (80%) of a plug-rated current $I_{rated}$ over a three hour period.

These and other objects, features and advantages of the present invention will become apparent in light of the detailed description of the best mode embodiment thereof, as illustrated in the accompanying drawings.

DETAILED DESCRIPTION OF PREFERRED EMBODIMENTS

Figure 1:
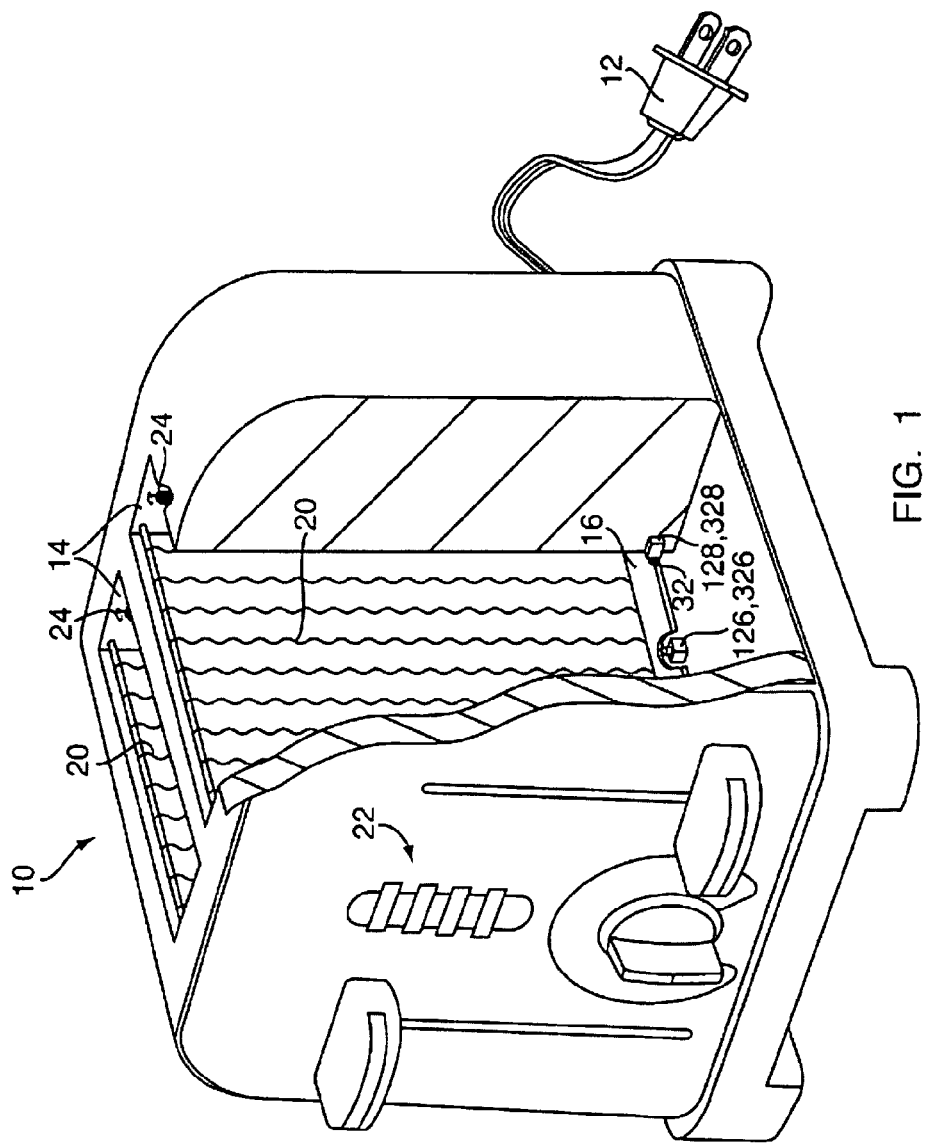
FIG. 1 is a cut-away view of an electric heating appliance according to an embodiment of the present invention.

Referring to FIG. 1, one embodiment of the inventive electric heating appliance is a toaster 10. The toaster 10 has a standard plug 12 and electrical cord for receiving power from an AC electrical outlet (not shown), a plurality of slots 14 housing corresponding movable carriages 16 for receiving food items and corresponding heating elements 20 for toasting the received food items, and at least one toast color input 22, as further discussed below with reference to FIG. 3.

A carriage spring 24 is provided for each movable carriage 16 to force the movable carriage 16 away from an engaged position to one of a plurality of non-engaged positions. In the engaged position, each movable carriage 16 actuates a corresponding toast switch 126 or 326 to energize the corresponding heating elements 20. Each toast switch 126 or 326 also energizes a solenoid 128 or 328, which moves a latch 32 to hold the corresponding movable carriage 16 in the engaged position against the force of the carriage spring 24. De-energizing the solenoid 128 or 328 releases the corresponding movable carriage 16, thereby opening the corresponding toast switch 126 or 326, as discussed in further detail with reference to FIGS. 2-5.

Figure 2:
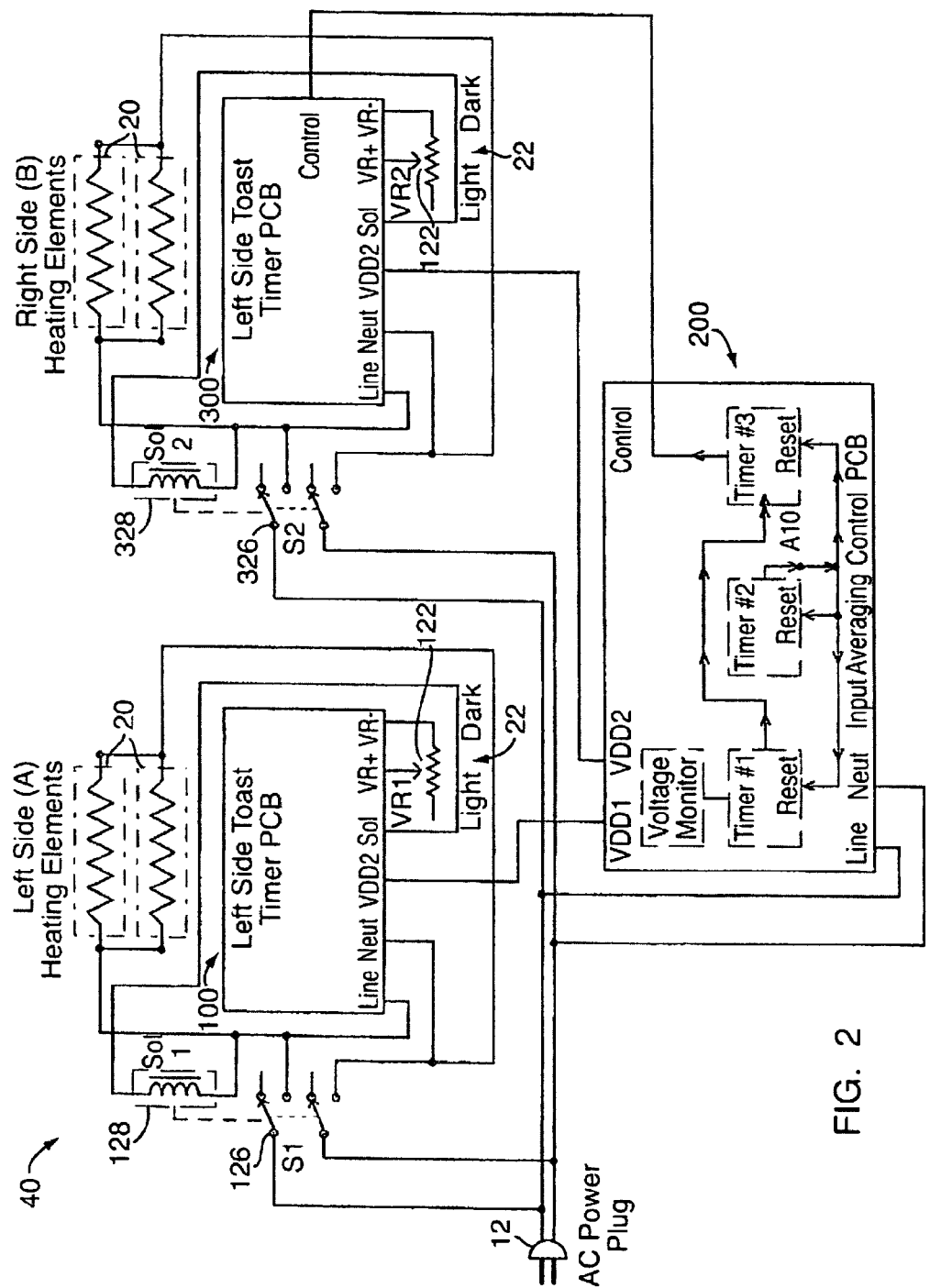
FIG. 2 is a circuit diagram of an appliance control circuit for the electric heating appliance of FIG. 1, according to an embodiment of the present invention.

Referring to FIG. 2, each of the solenoids 128, 328 and each of the associated toast switches 126, 326 is part of an appliance control circuit 40 for distributing current to appropriate heating elements 20, based on the position of each of the movable carriages 16 and the toast color input 22. The appliance control circuit 40 also includes a plurality of heating timer circuits 100, 300 and an input averaging control circuit 200 operatively connected to each of the heating timer circuits 100, 300 (as better shown in FIG. 4). Each of the heating timer circuits 100, 300 also is operatively connected to a corresponding solenoid 128 or 328, a corresponding toast switch 126 or 326, and a corresponding toast color input 22 (as better shown in FIGS. 3 and 5).

Each of the toast switches 126, 326 is actuated by motion of the corresponding movable carriage 16, so that the toast switch 126 or 326 is closed when the corresponding movable carriage 16 is in the engaged position, and is opened when the corresponding movable carriage 16 is not in the engaged position.

Figure 3:
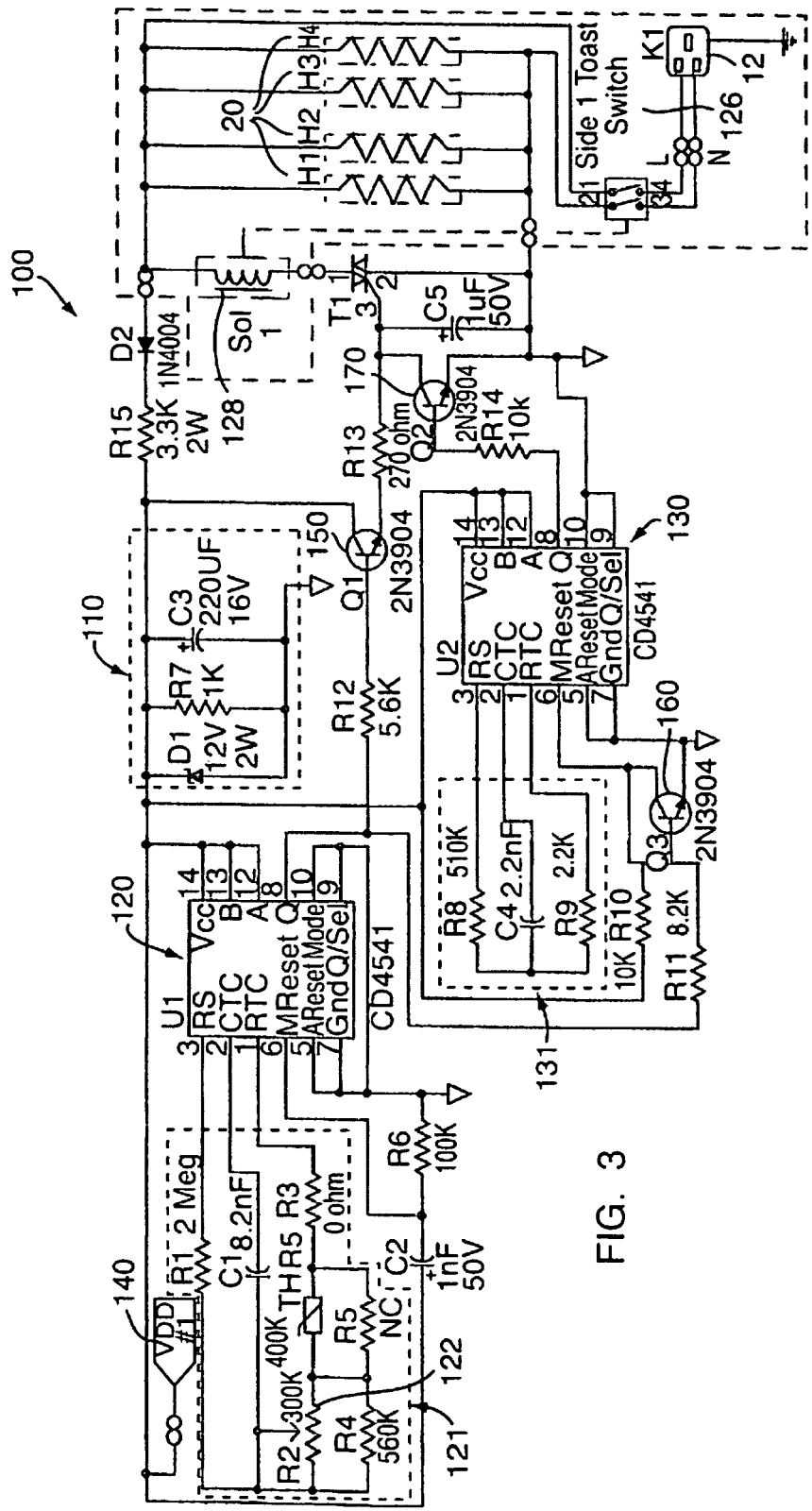
FIG. 3 is a circuit diagram of a first heating timer circuit used in the appliance control circuit of FIG. 2, according to an embodiment of the present invention.
Figure 4:
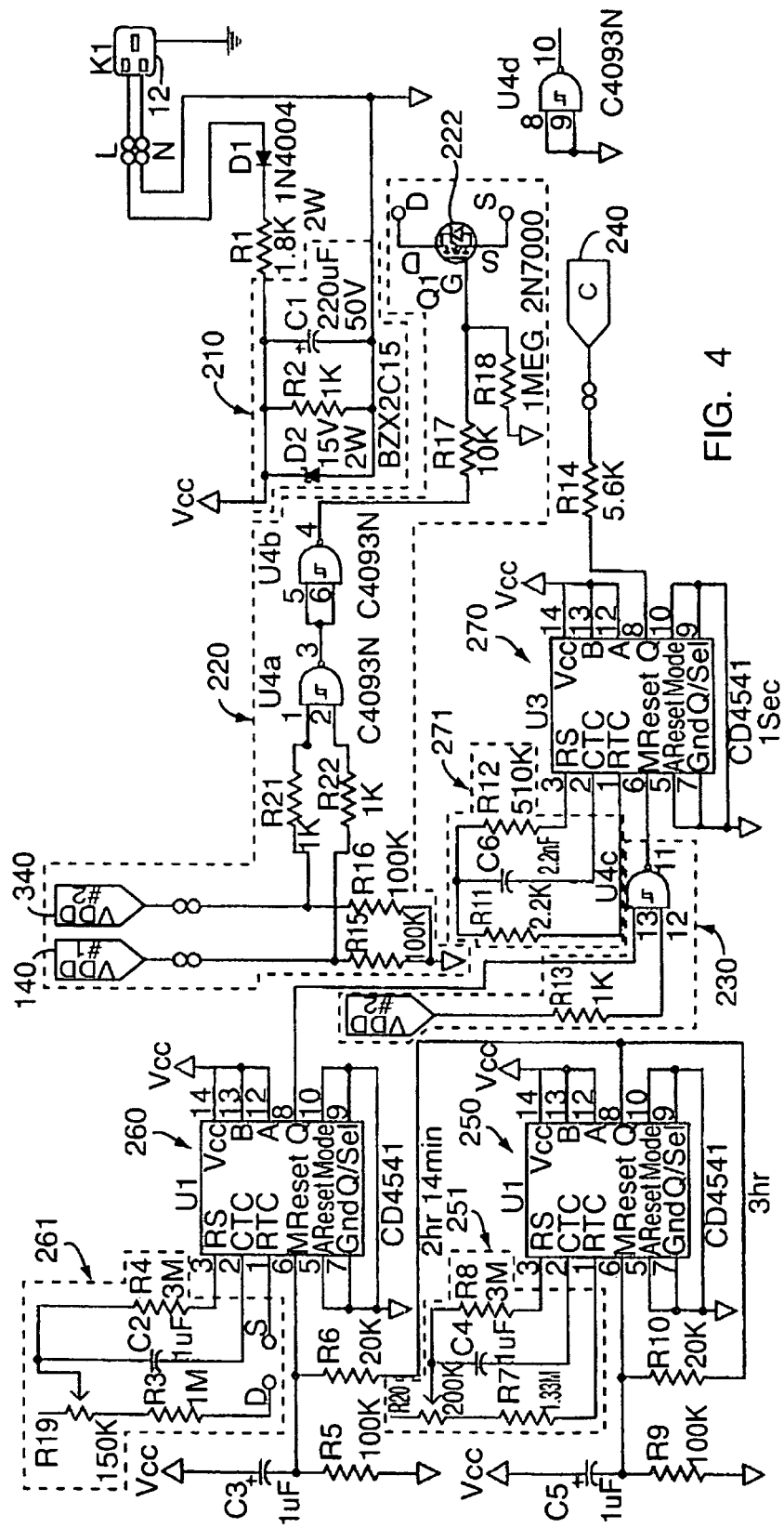
FIG. 4 is a circuit diagram of an input averaging current circuit used in the appliance control circuit of FIG. 2, according to an embodiment of the present invention.
Figure 5:
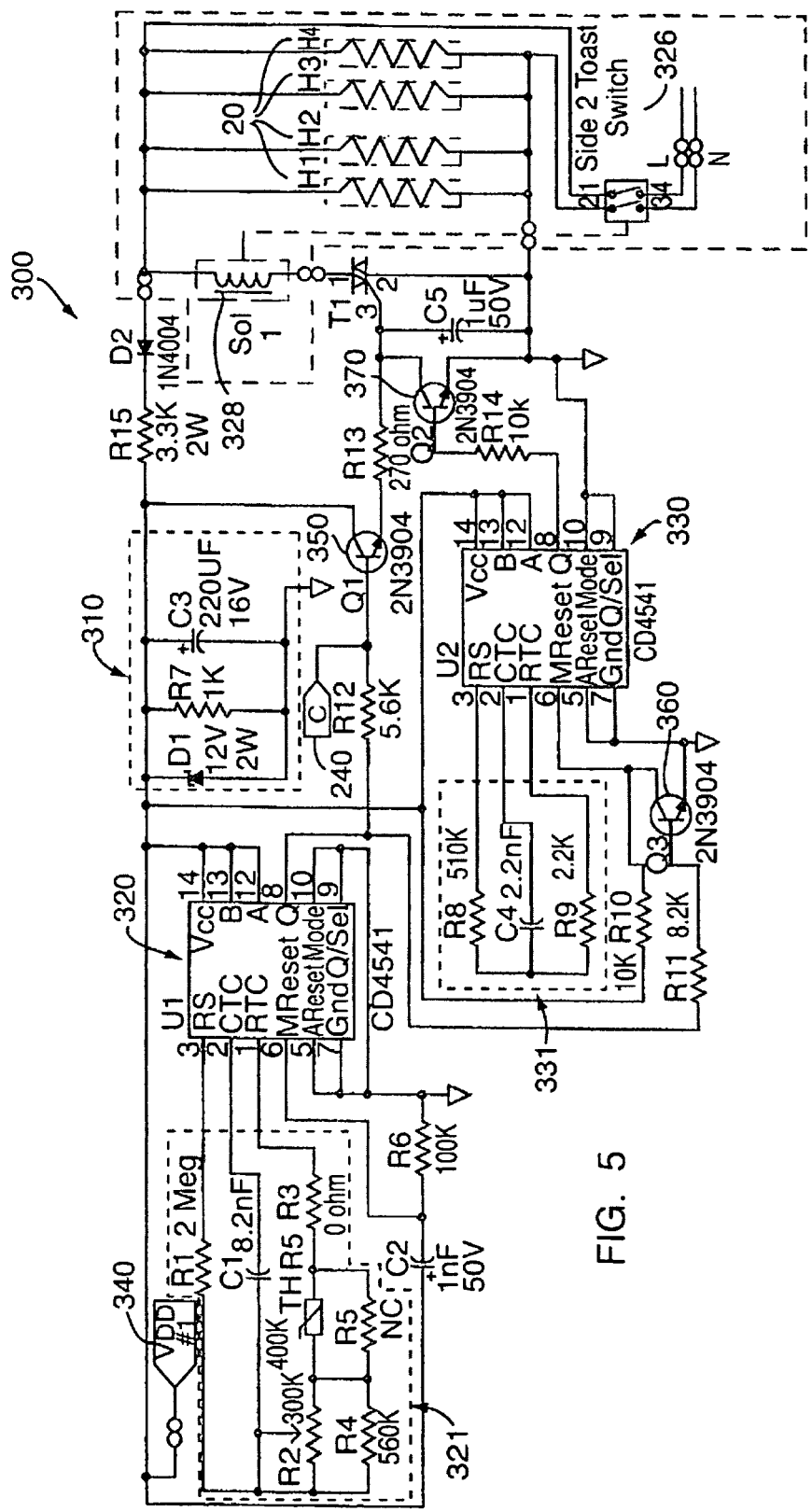
FIG. 5 is a circuit diagram of a second heating timer circuit used in the appliance control circuit of FIG. 2, according to an embodiment of the present invention.

In FIGS. 3 and 5, like components of a first heating timer circuit 100 and of a second heating timer circuit 300 are numbered with like reference numbers, prefixed by "1" or "3" to correspond to the reference numbers of the heating timer circuits 100, 300. In the following description of the embodiment shown in FIGS. 3-5, "operating voltage" refers to a voltage normally provided from a power supply of the circuit being described. "Biasing voltage" refers to a voltage sufficient to forward-bias the transistor being described.

Referring to FIG. 3, each heating timer circuit 100 includes a 12V DC power supply circuit 110, a toast color timer 120, a solenoid release timer 130, and a voltage contact 140. The 12V DC power supply circuit 110 receives AC from the standard plug 12 and provides non-isolated, half-wave rectified, filtered DC to the other components of the heating timer circuit 100. The toast color timer 120 and the solenoid release timer 130 are programmable RC oscillator timers with associated RC circuits 121, 131 for controlling the oscillator frequency. In the exemplary embodiment shown in FIGS. 3 and 5, the various programmable timers 120, 130, 320, 330 are known to those of ordinary skill as type 4541 timers, commercially available from a variety of sources including Fairchild Semiconductor™.

Each of the programmable timers 120, 130, 320, 330 includes oscillator control pins, an auto reset pin, a master reset pin, an output pin, an output select pin, a mode pin, time setting pins, and a power pin. Each timer is activated while and only when the power pin receives DC and the oscillator control pins are connected to a continuous RC circuit. Each timer counts from zero to a time limit determined by the time setting pins and by parameters of the RC circuit connected to the oscillator control pins. The output select pin and the mode pin determine what voltage is provided at the output pin while the timer counts and when the timer reaches the time limit. Operating voltage received at the master reset pin will reset the timer to a zero count. Operating voltage received at the auto reset pin will cause the timer to reset to a zero count when DC is first supplied to the power pin.

The toast color RC circuit 121 associated with the toast color timer 120 includes a user-adjustable potentiometer 122 operatively connected to the associated toast color input 22 for setting a toast color time limit based on desired toast color. The toast color timer 120 is operatively connected to receive DC from the 12V DC power supply circuit 110, and is configured to increment a toast time upward from zero toward the toast time limit and to reset the toast time to zero on power-up. The toast color timer 120 also is configured and operatively connected to output a biasing voltage to a solenoid bypass transistor 150 and to a solenoid release reset transistor 160 when the toast time reaches the toast time limit.

The solenoid release timer 130 is operatively connected to receive DC from the 12V DC power supply circuit 110, and to receive a reset voltage signal from the solenoid release reset transistor 160, and is configured and operatively connected to output a biasing voltage to a backup solenoid bypass transistor 170 when receiving the reset voltage signal. The solenoid release reset transistor 160 is operatively connected to provide the reset voltage signal to the solenoid release timer 130 when the solenoid release reset transistor 160 receives the biasing voltage from the toast color timer 120.

The voltage contact 140 or 340 provides an approximately 12V DC signal whenever the heating timer circuit 100 or 300 is energized.

The solenoid bypass transistor 150 and the backup solenoid bypass transistor 170 are operatively connected to receive a biasing voltage as described above, and further operatively connected to divert current from the associated solenoid 128 while receiving the biasing voltage, thereby de-energizing the associated solenoid 128. Accordingly, the heating timer circuit 100 is configured to de-energize the associated solenoid 128 when the toast time reaches the toast color time limit.

Referring to FIG. 4, the input averaging control circuit 200 includes a 15V DC power supply circuit 210, a clock enable circuit 220, a control release reset circuit 230, a solenoid control contact 240, a cycle timer 250, a full power timer 260, and a control release timer 270. In the exemplary embodiment shown in FIG. 4, the various programmable timers 250, 260, 270 are known to those of ordinary skill as type 4541 timers, commercially available from a variety of sources including Fairchild Semiconductor™, and described in greater detail above.

The 15V DC power supply circuit 210 is configured to provide non-isolated, half-wave rectified, filtered DC power to the other components of the input averaging control circuit 200 whenever the appliance receives AC from the standard plug 12. The clock enable circuit 220 is configured to provide a biasing voltage to a clock enable transistor 222 only when all the voltage contacts 140, 340 provide approximately 12V DC signals to the clock enable circuit 220. The control release reset circuit 230 is configured to continuously supply operating voltage to reset the control release timer 270 while the input averaging control circuit 200 receives AC from the plug 12, until the control release reset circuit 230 receives operating voltage from the full power timer 260 and from the voltage contact 140 or 340 of at least one heating timer circuit 100 or 300. The solenoid control contact 240 is operatively connected to convey operating voltage from the control release timer 270 to the solenoid release transistor of the second heating timer circuit 300.

In the embodiment shown in FIG. 4, each of the cycle timer 250, the full power timer 260, and the control release timer 270 is a programmable RC oscillator timer with an associated RC circuit 251, 261, or 271 for controlling the oscillator frequency. Preferably, each of the programmable timers is a 4541 programmable timer with an on-board RC oscillator and a power-up reset circuit, commercially obtainable from a variety of sources including Fairchild Semiconductor Corporation and described in detail in technical specification CD4541BC, hereby incorporated by reference in its entirety.

The cycle timer 250 and the associated cycle RC circuit 251 are configured so that, while the appliance control circuit 40 receives power from the standard plug 12, the cycle timer 250 counts up from zero to a cycle time limit of three hours (3 hrs). Further, the cycle timer 250 is configured so that, when the cycle time reaches the cycle time limit, the cycle timer 250 outputs operating voltage to reset the cycle timer 250 and the full power timer 260. In one embodiment, the cycle time limit is set at three hours (3 hrs) based on industry standard UL-197 section 48 for input averaging current $I_{avg}$ less than eighty percent (80%) of plug rated power over a three hour (3 hr) period. Any other value for the cycle time limit could be used without departing from the teachings of the present invention.

The full power timer 260 is configured so that, while the full power RC circuit 261 associated with the full power timer 260 is continuous, the full power timer 260 increments a stored full power time toward a full power time limit $T_1$ that is determined by applying the following constraints to Eqn. 1, where f is a required safety factor set equal to 0.8, s is the number of toaster slots 14 set equal to two (2), and $I_{FP}$ is the input current drawn by the toaster 10 with all heating elements 20 energized:

$$I_{avg} = f(I_{rated}); I_1 = I_{FP}; I_2 = \frac{s-1}{s}(I_1) \quad \text{(Eqn. 2)}$$

$$T_2 = T_{cyc} - T_1 \quad \text{(Eqn. 3)}$$

thereby obtaining $$T_1 \leq \left(\frac{1.6 I_{rated} - I_{FP}}{I_{FP}}\right) T_{cyc}. \quad \text{(Eqn. 4)}$$

In the embodiment of FIGS. 1-5, $I_{FP}$ is 18.33 A, $I_{rated}$ is 20 A, $T_{cyc}$ is three hours (3 hrs), and accordingly $T_1$ is approximately two hours and fourteen minutes (134 min). Other values of the various parameters may be used without departing from the teachings of the present invention.

In the embodiment shown in FIG. 4, the full power RC circuit 261 includes the clock enable transistor 222 so that the full power RC circuit 261 is continuous only while the clock enable circuit 220 forward biases the clock enable transistor 222. Accordingly, the full power timer 260 increments the full power time toward the full power time limit of two hours and fourteen minutes (2 hrs 14 min) only while the clock enable circuit 220 receives operating voltage from all of the voltage contacts 140, 340. Otherwise, the full power timer 260 stores the full power time until reset by the cycle timer 250. The full power timer 260 further is configured for single cycle operation so that, when the full power time reaches the full power time limit, the full power timer 260 continuously outputs operating voltage to the control release reset circuit 230 until reset by the cycle timer 250.

The control release timer 270 is configured to repeatedly provide one second (1 sec) pulses of operating voltage to the solenoid control contact 240 while the appliance control circuit 40 receives AC from the plug 12, except when the control release timer 270 receives operating voltage from the control release reset circuit 230. As above discussed, the control release reset circuit 230 is configured to provide operating voltage to the control release timer 270 while the input averaging control circuit 200 receives AC from the plug 12, except when the control release reset circuit 230 receives operating voltage from the full power timer 260 and from at least one heating timer circuit voltage contact 140 or 340. Thus, the input averaging control circuit 200 is configured to provide one second pulses of operating voltage to the solenoid control contact 240 only while the control release reset circuit 230 receives operating voltage from the full power timer 260 and from at least one of the voltage contacts 140, 340.

Referring to FIG. 5, the second heating timer circuit 300 differs from the first heating timer circuit 100 in that the second heating timer circuit 300 includes the solenoid control contact 240 as an additional source of a biasing voltage to the solenoid bypass transistor 350 and to the solenoid release reset transistor 360. Accordingly, the second heating timer circuit 300 is configured to de-energize the corresponding solenoid 128 or 328, thereby releasing the associated carriage 16 and de-energize the associated heating element 20, when the toast time reaches the toast time limit or when the solenoid control contact 240 is supplied with operating voltage from the control release timer 270.

In normal (less than full power) operation, each of the heating timer circuits 100, 300 supplies current to the associated solenoid 128 or 328 while the associated movable carriage 16 is in the engaged position, unless current is diverted from the solenoid 128 or 328 by operation of the input averaging control circuit 200 as further discussed below. Movement of the carriage 16 away from the engaged position opens the associated toast switch 126 or 326, thereby removing current from the associated heating elements 20 and from the associated solenoid 128 or 328. A temperature sensor (not shown) can also be provided in each slot 14 for opening a thermal switch (not shown) and thereby removing current from the solenoid 128 or 328 and from the heating elements 20 associated with the slot 14 when sensed temperature exceeds a predetermined temperature limit.

Figure 6:
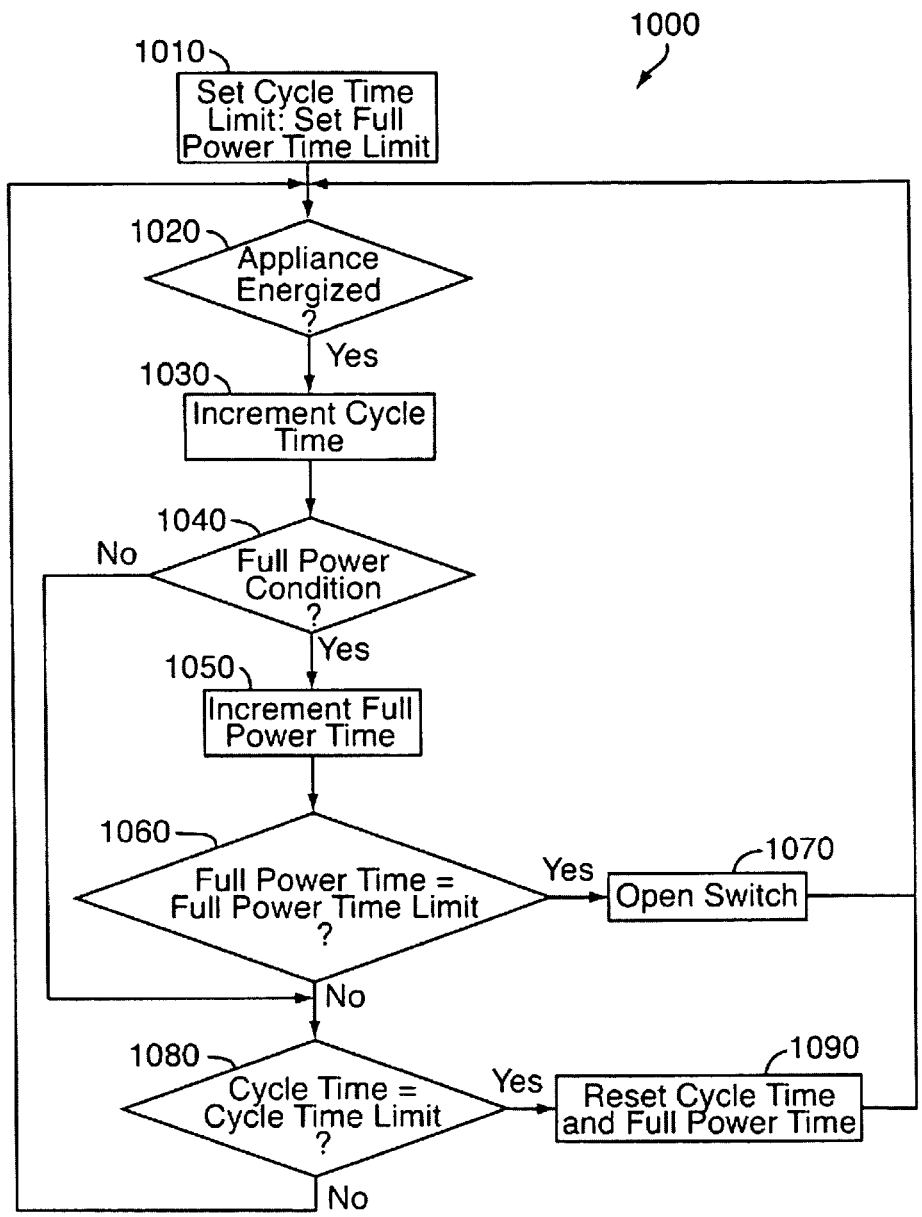
FIG. 6 is a flow diagram of a method of reducing current in an electric heating appliance, according to an embodiment of the present invention.

The input averaging control circuit 200 is operative whenever the toaster 10 receives AC from the standard plug 12. Referring to FIG. 6, the input averaging control circuit 200 is configured to perform a method 1000 for controlling input average current. When the appliance 10 is first energized, the IACC 200 sets cycle and full power time limits according to block 1010. Then, while the appliance 10 is energized, the cycle timer 250 continuously and repeatedly increments the cycle time up to the cycle time limit, then resets itself and the full power timer 260, as shown at blocks 1020, 1030, 1080, and 1090. Concurrently, the control release reset circuit 230 continuously provides operating voltage to reset the control release timer 270, thereby preventing the control release timer 270 from providing operating voltage to the solenoid control contact 240.

Accordingly, when one of the movable carriages 16 is moved to the engaged position to close the corresponding toast switch 126 or 326 and energize the associated heating elements 20, the corresponding heating timer circuit 100 or 300 energizes the associated solenoid 128 or 328 to latch the carriage 16, while the corresponding toast color timer 120 begins to count up to a toast color time limit set by the associated toast color input 22.

The heating timer circuit 100 or 300 also energizes the associated voltage contact 140 or 340, which provides operating voltage to the input averaging control circuit 200. When the toast color timer 120 reaches the toast color time limit, the toast color timer 120 forward biases the solenoid bypass transistor 150 and the solenoid release reset transistor 160; the solenoid release timer 130 then forward biases the backup solenoid bypass transistor 170, providing a bypass circuit to de-energize the solenoid 128 or 328 and thereby release the movable carriage 16.

In full power operation, referring to FIGS. 4 and 6, the input averaging control circuit 200 accomplishes the remainder of the method 1000 for preventing excessive input averaging current. Full power operation is initiated when all of the movable carriages 16 are moved to the corresponding engaged positions, and all of the voltage contacts 140, 340 are energized and provide operating voltage to the input averaging control circuit 200. Accordingly, the clock enable circuit 220 determines whether the electric appliance 10 is in a full power condition, as shown at block 1040. If so, then the clock enable transistor 222 is forward biased by the clock enable circuit 220 so as to make the full power RC circuit 261 continuous, and the full power timer 260 counts up toward the full power time limit, as shown at block 1050, until one of the movable carriages 16 is released from the corresponding engaged position by normal operation of the corresponding heating timer circuit 100 or 300, or until the full power time limit is reached as shown at block 1060.

When the full power time limit is reached, the full power timer 260 provides operating voltage to the control release reset circuit 230, which also receives operating voltage from at least one voltage contact 140 or 340. The control release reset circuit 230 then ceases to provide operating voltage to reset the control release timer 270. The control release timer 270 then provides a one-second pulse of operating voltage through the control contact to forward bias the solenoid bypass transistor 350 and the solenoid release reset transistor 360 of the second heating timer circuit 300. The solenoid bypass transistor 350 and the backup solenoid bypass transistor 370 then bypass and de-energize the solenoid 128 or 328 to release the movable carriage 16 associated with the second heating timer circuit 300, returning the toaster 10 to normal operation, as shown at block 1070 of FIG. 6.

The full power timer 260 is configured for single cycle operation, as known in the art and as shown in FIG. 4. Accordingly, once the full power time limit has been reached, the full power timer 260 continues to provide operating voltage to the control release reset circuit 230 until the cycle timer 250 reaches the cycle time limit and resets the full power timer 260. Thus, full power operation is prevented for the remainder of the three hour (3 hr) cycle.

It is therefore one advantage of the present invention that the full power timer 260 cooperates with the cycle timer 250 to provide precise compliance with the industry standard UL-197 section 48. That is, during energization of the heating elements 20, the full power timer 260 increments a full power time until reset by the cycle timer 250, or until reaching a full power time limit at which the full power timer 260 cooperates with the reset timer 270 to de-energize at least one of the heating elements 20. Thus, the present invention ensures that for a three (3) hour averaging time period $T_{cyc}$, the input averaging current $I_{avg}$ does not exceed eighty percent (80%) of the plug-rated current $I_{rated}$.

It is therefore another important aspect of the present invention that the detection of the input averaging current is accomplished by direct measurement of electrical values related to the heating elements 20, rather than by empirical correlation to non-electrical values such as temperature.

It will be readily appreciated that since the average operating power of the electrical appliance is directly determined, it is possible for the present invention to employ both the full power timer 260 and the cycle timer 20 in order to ensure that the requirements of UL standard 197 section 48 assuredly are met.

Although this invention has been shown and described with respect to detailed embodiments thereof, it will be understood by those skilled in the art that various changes in form and detail may be made without departing from the spirit and the scope of the invention.

For example, the functions of the programmable timers can be achieved using microcontrollers, ASIC timers, discrete timers, or other means for timing well known in the art, such as electromechanical timers including piezoelectric timers.

As another example, those of ordinary skill in the art will appreciate that an electric heating appliance may also be any of a dishwasher, an oven, a stove, a washer or dryer, or another domestic appliance including a heating element.

As a further example, although each of the solenoids in the preferred embodiment is energized to hold an associated carriage in an engaged position, an embodiment wherein each solenoid is energized to release the associated carriage from the engaged position also comes within the teachings of the present invention.

As yet another example, the functions provided by the carriage springs and latch associated with each carriage can instead be provided by the associated solenoid alone.

What is claimed is:

1. An over current protection circuit for an appliance, the circuit comprising:
   a plurality of contacts for sensing a plurality of corresponding load currents;
   a full power timer configured and operatively connected to reduce a total current $I_{avg}$ in the appliance on reaching a full power time limit $T_1$; and
   a clock enable circuit configured and operatively connected to operate the full power timer only while all of the contacts sense corresponding load currents.

2. The circuit according to claim 1, and further comprising:
   a cycle timer configured to produce a cycle signal on reaching a cycle time limit $T_{cyc}$, and operatively connected to provide the cycle signal as a reset signal to the cycle timer and to the full power timer, the cycle timer further being configured to reset to a cycle reset value on receipt of the reset signal,
   wherein the full power timer is operatively connected to receive the reset signal from the cycle timer and is configured to reset to a full power reset value on receipt of the reset signal.

3. The circuit according to claim 2, wherein the cycle time limit $T_{cyc}$ is three hours.

4. The circuit according to claim 2, the full power timer having a reset pin for receiving the reset signal.

5. The circuit according to claim 2, the cycle timer having an output pin for providing the reset signal.

6. The circuit according to claim 2, wherein $I_{rated}$ is a plug-rated current of the appliance, $I_{FP}$ is a full power current draw of the appliance, and wherein the full power timer and the cycle timer are configured such that $$T_1 \leq T_{cyc} \times (1.6\, I_{rated} - I_{FP})/I_{FP}.$$

7. The circuit according to claim 1, and further comprising:
   a release circuit configured and operatively connected to receive a full power signal and to provide a control signal to de-energize a part of the appliance when the release circuit receives the full power signal,
   wherein the full power timer is configured and operatively connected to provide the full power signal to a release circuit on reaching the full power time limit $T_1$.

8. The circuit according to claim 7, wherein the control signal forward biases a solenoid bypass transistor.

9. The circuit according to claim 7, wherein the part of the appliance is a heating element.

10. The circuit according to claim 7, wherein the part of the appliance is a solenoid.

11. An appliance comprising:
    a plurality of electrical loads; and
    a load control circuit including at least a clock enable circuit and a full power timer,
    wherein the clock enable circuit is configured and operatively connected to activate the full power timer when all of the loads are energized, and the full power timer is configured and operatively connected to de-energize at least one load selected from the plurality of loads on reaching a predetermined full power time limit.

12. The appliance according to claim 11, wherein the load control circuit also includes a cycle timer configured and operatively connected to reset the cycle timer and the full power timer on reaching a cycle time limit.

13. The appliance according to claim 11, further comprising:
    a carriage movable between an engaged position and a plurality of non-engaged positions;
    a toast switch operable to energize the at least one selected heating element only when the carriage is in the engaged position; and a solenoid operable to hold the carriage in the engaged position when the solenoid is energized, and to release the carriage from the engaged position when the solenoid is de-energized, wherein the plurality of loads are heating elements, and the full power timer is operatively connected to de-energize at least one selected heating element by de-energizing the solenoid.

14. The appliance according to claim 13, further comprising a transistor operatively connected to divert current from the solenoid, wherein the full power timer is operatively connected to de-energize the solenoid by forward-biasing the transistor.

* * * * *